US011934116B2

(12) United States Patent
Hanamoto

(10) Patent No.: US 11,934,116 B2
(45) Date of Patent: Mar. 19, 2024

(54) TRANSFER UNIT WITH A NON-SELECTED TRANSFER ROLLER RETRACTED BEHIND A GUIDE AND IMAGE FORMING APPARATUS THEREWITH

(71) Applicant: KYOCERA Document Solutions Inc., Osaka (JP)

(72) Inventor: Katsuhiko Hanamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 17/875,028

(22) Filed: Jul. 27, 2022

(65) Prior Publication Data

US 2023/0044638 A1 Feb. 9, 2023

(30) Foreign Application Priority Data

Aug. 4, 2021 (JP) ................................ 2021-128032

(51) Int. Cl.
*G03G 15/16* (2006.01)
*B65H 29/12* (2006.01)
(Continued)

(52) U.S. Cl.
CPC ........... *G03G 15/162* (2013.01); *B65H 29/12* (2013.01); *G03G 15/0131* (2013.01); *G03G 15/0136* (2013.01); *G03G 15/0189* (2013.01); *G03G 15/165* (2013.01); *G03G 15/1655* (2013.01); *G03G 15/1665* (2013.01); *G03G 15/167* (2013.01); *G03G 15/1685* (2013.01); *G03G 21/1685* (2013.01); *B65H 2404/1421* (2013.01); *B65H 2404/1532* (2013.01); *B65H 2404/17* (2013.01); *G03G 2215/0125* (2013.01);
(Continued)

(58) Field of Classification Search
CPC ........... G03G 15/0131; G03G 15/0136; G03G 15/165; G03G 15/1655; G03G 15/1665; G03G 15/167; G03G 15/1685; G03G 21/1685; G03G 2215/1614; G03G 2215/1619
See application file for complete search history.

(56) References Cited

U.S. PATENT DOCUMENTS

2017/0255133 A1 9/2017 Kubota et al. ..... G03G 15/1605
2020/0050133 A1* 2/2020 Ohta ................. G03G 15/1665

FOREIGN PATENT DOCUMENTS

JP 2017-156653 A 9/2017

* cited by examiner

*Primary Examiner* — Joseph S Wong
(74) *Attorney, Agent, or Firm* — Stein IP, LLC

(57) ABSTRACT

A transfer unit includes first and second rollers, a roller switching mechanism, and upstream-side and downstream-side guides. The second roller is arranged downstream of the first roller in the conveyance direction of the recording medium. The roller switching mechanism selectively arranges the first or second roller at a reference position to form a transfer nip. The upstream-side and downstream-side guides are respectively arranged upstream and downstream of the transfer nip in the conveyance direction of the recording member. When the first roller moves to the reference position by the roller switching mechanism, the second roller moves to a first retracted position behind the downstream-side guide, and when the second roller moves to the reference position by the roller switching mechanism, the first roller moves to a second retracted position behind the upstream-side guide.

8 Claims, 12 Drawing Sheets

(51) Int. Cl.
*G03G 15/01* (2006.01)
*G03G 21/16* (2006.01)
(52) U.S. Cl.
CPC ............... *G03G 2215/1614* (2013.01); *G03G 2215/1619* (2013.01)

TRANSFER UNIT WITH A NON-SELECTED TRANSFER ROLLER RETRACTED BEHIND A GUIDE AND IMAGE FORMING APPARATUS THEREWITH

INCORPORATION BY REFERENCE

This application is based on and claims the benefit of priority from Japanese Patent Application No. 2021-128032 filed on Aug. 4, 2021, the contents of which are hereby incorporated by reference.

BACKGROUND

The present disclosure relates to a transfer unit for transferring to a recording medium a toner image formed on an image carrying member such as a photosensitive drum or an intermediate transfer belt. The present disclosure also relates to an image forming apparatus incorporating such a transfer unit, and particularly to a mechanism for switching the arrangement of a plurality of transfer members.

Conventionally, there is a known intermediate transfer-type image forming apparatus including an endless intermediate transfer belt that rotates in a prescribed direction and a plurality of image forming portions provided along the intermediate transfer belt. In the image forming apparatus, by the image forming portions, toner images of respective colors are primarily transferred to the intermediate transfer belt by being sequentially superimposed on each other, after which the toner images are secondarily transferred by a secondary transfer roller to a recording medium such as paper.

In such intermediate transfer-type image forming apparatuses, adhesion of toner to the surface of the secondary transfer roller accumulates due to durable printing. In particular, to improve the color development and the color reproducibly, it is necessary to execute calibration for correcting the image density and the color displacement with predetermined timing, and the patch image formed on the intermediate transfer belt during execution of calibration is, instead of being transferred to the sheet, removed by a belt cleaning device. This causes, as the patch image passes through the secondary transfer roller, part of the toner transferred to the intermediate transfer belt to adhere to the secondary transfer roller.

Conventionally, the secondary transfer roller is cleaned by applying a reverse transfer voltage (a voltage with the same polarity as the toner) to the secondary transfer roller during a non-image forming period to move the toner deposited on the secondary transfer roller back to the intermediate transfer belt. However, this method is disadvantageous in that cleaning of the secondary transfer roller takes time, resulting in longer printing wait time.

SUMMARY

According to one aspect of the present disclosure, a transfer unit includes a transfer roller having a metal shaft and an elastic layer laid around the circumferential face of the metal shaft to form a transfer nip by keeping the elastic layer in pressed contact with an image carrying member, and transfers a toner image formed on the image carrying member to a recording medium as it passes through the transfer nip. The transfer unit includes, as the transfer rollers, a first roller and a second roller, a roller switching mechanism, upstream-side and downstream-side guide. The second roller is arranged downstream of the first roller in the conveyance direction of the recording medium and is different from the first roller in the length of the elastic layer in the axial direction. The roller switching mechanism arranges the first or second roller selectively at a reference position where the first or second roller forms the transfer nip by being kept in pressed contact with the image carrying member. An upstream-side guide and a downstream-side guide are respectively arranged upstream and downstream of the transfer nip in the conveyance direction of the recording member. When the first roller moves to the reference position by the roller switching mechanism, the second roller moves to a first retracted position behind the downstream-side guide, and when the second roller moves to the reference position by the roller switching mechanism, the first roller moves to a second retracted position behind the upstream-side guide.

DETAILED DESCRIPTION

Figure 1:
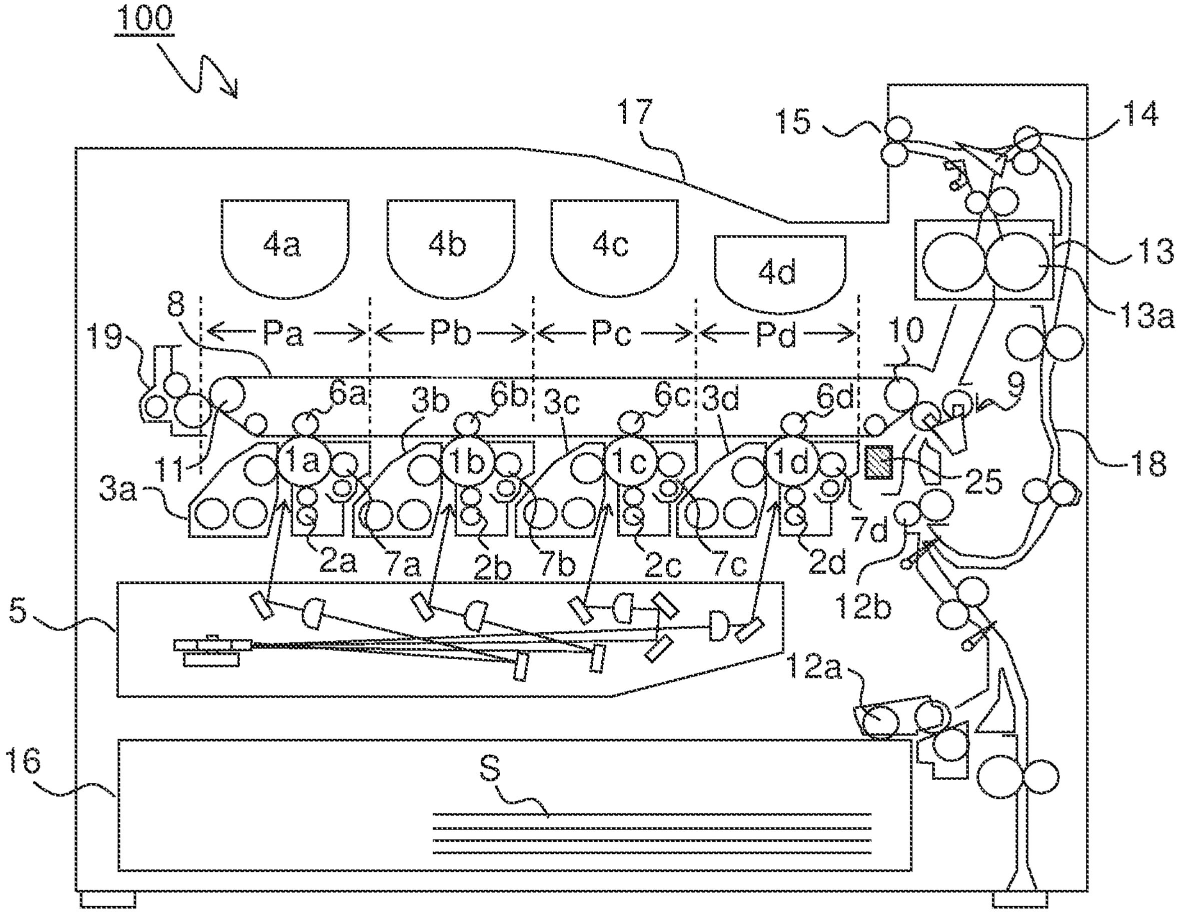
FIG. 1 is a schematic diagram showing an internal configuration of an image forming apparatus including a secondary transfer unit according to the present disclosure.
Figure 2:
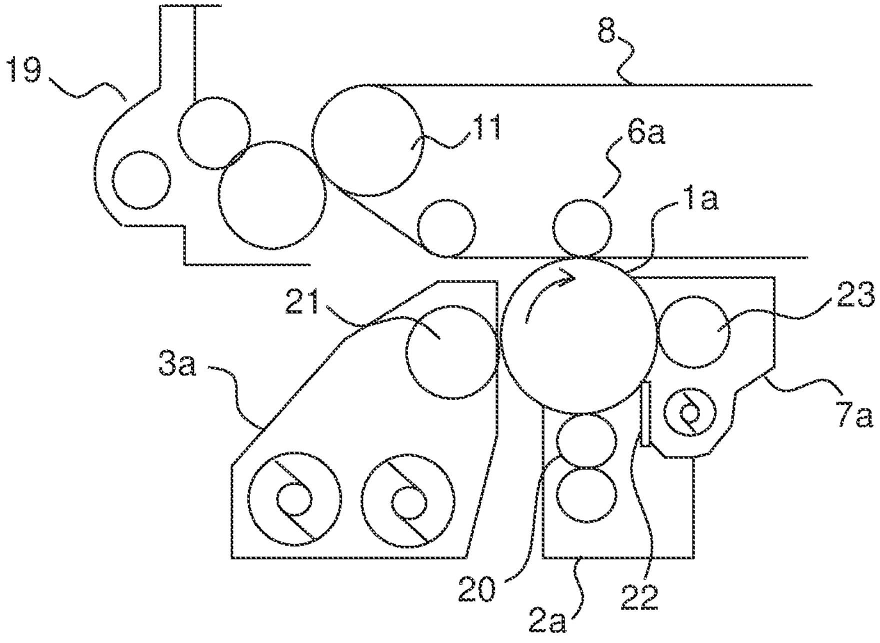
FIG. 2 is an enlarged view of and around an image forming portion in FIG. 1.

Hereinafter, with reference to the accompanying drawings, embodiments of the present disclosure will be described. FIG. 1 is a schematic diagram showing the configuration of an image forming apparatus 100 including a secondary transfer unit 9 according to the present disclosure, and FIG. 2 is an enlarged view of and around an image forming portion Pa in FIG. 1.

The image forming apparatus 100 shown in FIG. 1 is what is called a tandem-type color printer and is configured as follows. In the main body of the image forming apparatus 100, four image forming portions Pa, Pb, Pc and Pd are arranged in this order from upstream in the conveying direction (from the left side in FIG. 1). The image forming portions Pa to Pd are provided so as to correspond to images of four different colors (magenta, cyan, yellow, and black) and sequentially form images of magenta, cyan, yellow, and black, respectively, by following the steps of charging, exposure to light, development, and transfer.

In these image forming portions Pa to Pd, photosensitive drums 1*a*, 1*b*, 1*c*, and 1*d* are respectively arranged which carry visible images (toner images) of the different colors. Furthermore, an intermediate transfer belt 8 which rotates counter-clockwise in FIG. 1 is provided adjacent to the image forming portions Pa to Pd. The toner images formed on the photosensitive drums 1*a* to 1*d* are transferred sequentially to the intermediate transfer belt 8 that moves while keeping contact with the photosensitive drums 1*a* to 1*d* and then, in the secondary transfer unit 9, transferred at once to the sheet S, which is one example of a recording medium. Then, after the toner images are fixed on the sheet S in a fixing portion 13, the sheet is discharged from the main body of the image forming apparatus 100. An image forming process is performed with respect to the photosensitive drums 1*a* to 1*d* while they are rotated clockwise in FIG. 1.

The sheet S to which the toner images are transferred is stored in a sheet storing cassette 16 arranged in a lower part of the main body of the image forming apparatus 100, and is conveyed via a sheet feeding roller 12*a* and a pair of registration rollers 12*b* to the secondary transfer unit 9. Used typically as the intermediate transfer belt 8 is a belt without seams (seamless belt).

Next, a description will be given of the image forming portions Pa to Pd. The image forming portion Pa will be described in detail below. Since the image forming portions Pb to Pd have basically similar structures, no overlapping description will be repeated. As shown in FIG. 2, around the photosensitive drum 1*a*, there are arranged, in the drum rotation direction (clockwise in FIG. 2), a charging device 2*a*, a developing device 3*a*, a cleaning device 7*a*, and, across the intermediate transfer belt 8, a primary transfer roller 6*a*. In addition, upstream in the rotation direction of the intermediate transfer belt 8 with respect to the photosensitive drum 1*a*, a belt cleaning unit 19 is arranged so as to face a tension roller 11 across the intermediate transfer belt 8.

Next, a description will be given of an image forming procedure on the image forming apparatus 100. When a user enters an instruction to start image formation, first, a main motor 60 (see FIG. 8) starts rotating the photosensitive drums 1*a* to 1*d*, and charging rollers 20 in the charging devices 2*a* to 2*d* electrostatically charge the surfaces of the photosensitive drums 1*a* to 1*d* uniformly. Next, an exposure device 5 irradiates the surfaces of the photosensitive drums 1*a* to 1*d* with a beam of light (laser light) to form on them electrostatic latent images reflecting an image signal.

The developing devices 3*a* to 3*d* are loaded with predetermined amounts of toner of magenta, cyan, yellow, and black respectively. When, through formation of toner images, which will be described later, the proportion of toner in a two-component developer stored in the developing devices 3*a* to 3*d* falls below a determined value, toner is supplied from toner containers 4*a* to 4*d* to the developing devices 3*a* to 3*d* respectively. The toner in the developer is fed from developing rollers 21 in the developing devices 3*a* to 3*d* to the photosensitive drums 1*a* to 1*d* respectively, and electrostatically attaches to them. In this way, toner images corresponding to the electrostatic latent images formed through exposure to light from the exposure device 5 are formed.

Then, the primary transfer rollers 6*a* to 6*d* apply electric fields of a prescribed transfer voltage between themselves and the photosensitive drums 1*a* to 1*d*, and thus the toner images of magenta, cyan, yellow, and black respectively on the photosensitive drums 1*a* to 1*d* are primarily transferred onto the intermediate transfer belt 8. These images of four colors are formed in a predetermined positional relationship with each other that is prescribed for formation of a predetermined full-color image. After that, in preparation for the subsequent formation of new electrostatic latent images, the residual toner remaining on the surfaces of the photosensitive drums 1*a* to 1*d* is removed by cleaning blades 22 and rubbing rollers 23 in the cleaning devices 7*a* to 7*d*.

As a driving roller 10 is driven to rotate by a belt drive motor 61 (see FIG. 8) and the intermediate transfer belt 8 starts to rotate counter-clockwise, the sheet S is conveyed with predetermined timing from the pair of registration rollers 12*b* to the secondary transfer unit 9 provided adjacent to the intermediate transfer belt 8, where the full-color image is transferred to it. The sheet S to which the toner images have been transferred is conveyed to the fixing portion 13. Toner remaining on the surface of the intermediate transfer belt 8 is removed by the belt cleaning unit 19.

The sheet S conveyed to the fixing portion 13 is heated and pressed by a pair of fixing rollers 13*a* so that the toner images are fixed on the surface of the sheet S. and thus the prescribed full-color image is formed on it. The conveyance direction of the sheet S on which the full-color image has been formed is switched by a branch portion 14 branching into a plurality of directions, and thus the sheet S is directly (or after being conveyed to a double-sided conveyance path 18 and thus being subjected to double-sided printing) discharged onto a discharge tray 17 by a pair of discharge rollers 15.

Downstream of the image forming portion Pd, an image density sensor 25 is arranged at a position opposite the intermediate transfer belt 8. As the image density sensor 25, an optical sensor is typically used that includes a light-emitting element formed of an LED or the like and a light-receiving element formed of a photodiode or the like. To measure the amount of toner attached to the intermediate transfer belt 8, patch images (reference images) formed on the intermediate transfer belt 8 are irradiated with measurement light from the light-emitting element, so that the measurement light strikes the light-receiving element as light reflected by the toner and light reflected by the belt surface.

The light reflected from the toner and the belt surface includes a regularly reflected light component and an irregularly reflected light component. The regularly and irregularly reflected light are separated with a polarization splitting prism and strike separate light-receiving elements respectively. Each of the light-receiving elements performs photoelectric conversion on the received regularly or irregularly reflected light and outputs an output signal to the control portion 90 (see FIG. 8).

Then, from the change in the characteristics of the output signals with respect to the regularly and irregularly reflected light, the image density (toner amount) and the image position in the patch images are determined and compared with a predetermined reference density and a predetermined reference position to adjust the characteristic value of the developing voltage, the start position and the start timing of exposure by the exposure device 5, and so on. In this way, for each of the different colors, density correction and color displacement correction (calibration) are performed.

Figure 3:
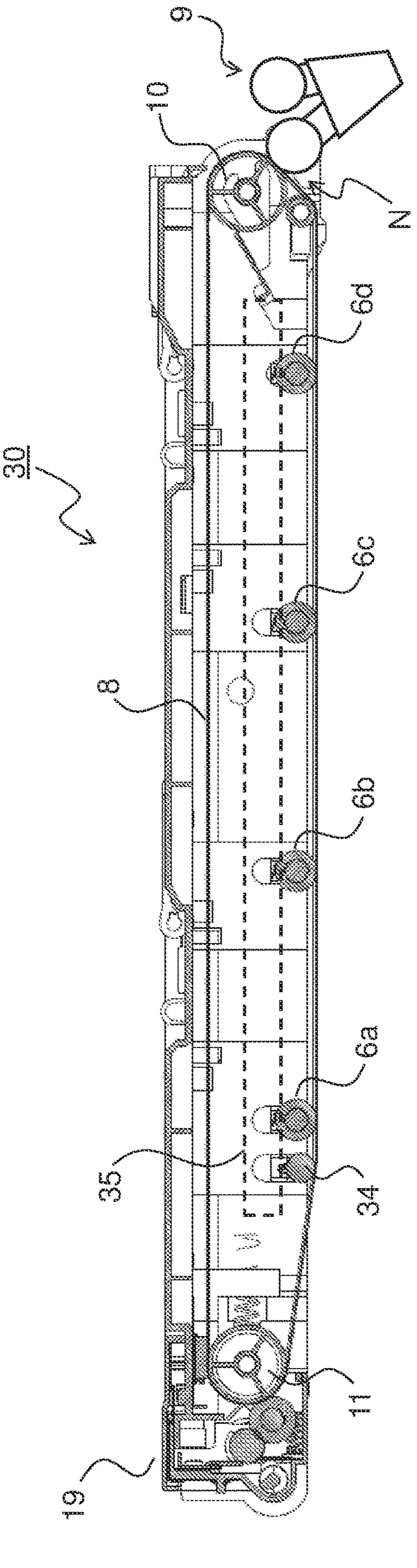
FIG. 3 is a side sectional view of an intermediate transfer unit mounted in the image forming apparatus.

FIG. 3 is a side sectional view of an intermediate transfer unit 30 incorporated in the image forming apparatus 100. As shown in FIG. 3, the intermediate transfer unit 30 includes the intermediate transfer belt 8 that is stretched between the driving roller 10 on the downstream side and the tension roller 11 on the upstream side, the primary transfer rollers 6*a* to 6*d* that are in contact with the photosensitive drums 1*a* to 1*d* via the intermediate transfer belt 8, and a pressing state switching roller 34.

The belt cleaning unit 19 for removing the residual toner remaining on the surface of the intermediate transfer belt 8 is arranged at a position opposite the tension roller 11. With the driving roller 10, the secondary transfer unit 9 is arranged via the intermediate transfer belt 8, forming a secondary transfer nip N. The detailed configuration of the secondary transfer unit 9 will be described later.

The intermediate transfer unit 30 includes a roller contact/release mechanism 35 including a pair of support members (not shown) that supports the opposite ends of the rotary shaft of each of the primary transfer rollers 6*a* to 6*d* and the pressing state switching roller 34 so that they are rotatable and movable perpendicularly (in the up-down direction in FIG. 3) with respect to the travel direction of the intermediate transfer belt 8, a driving means (not shown) for driving the primary transfer rollers 6*a* to 6*d* and the pressing state switching roller 34 to reciprocate in the up-down direction. The roller contact/release mechanism 35 permits switching among a color mode in which the four primary transfer rollers 6*a* to 6*d* are in pressed contact with the photosensitive drums 1*a* to 1*d*, respectively, via the intermediate transfer belt 8 (see FIG. 1) a monochrome mode in which only the primary transfer roller 6*d* is in pressed contact with the photosensitive drum 1*d* via the intermediate transfer belt 8, and a release mode in which the four primary transfer rollers 6*a* to 6*d* are all released from the photosensitive drums 1*a* to 1*d*, respectively.

Figure 4:
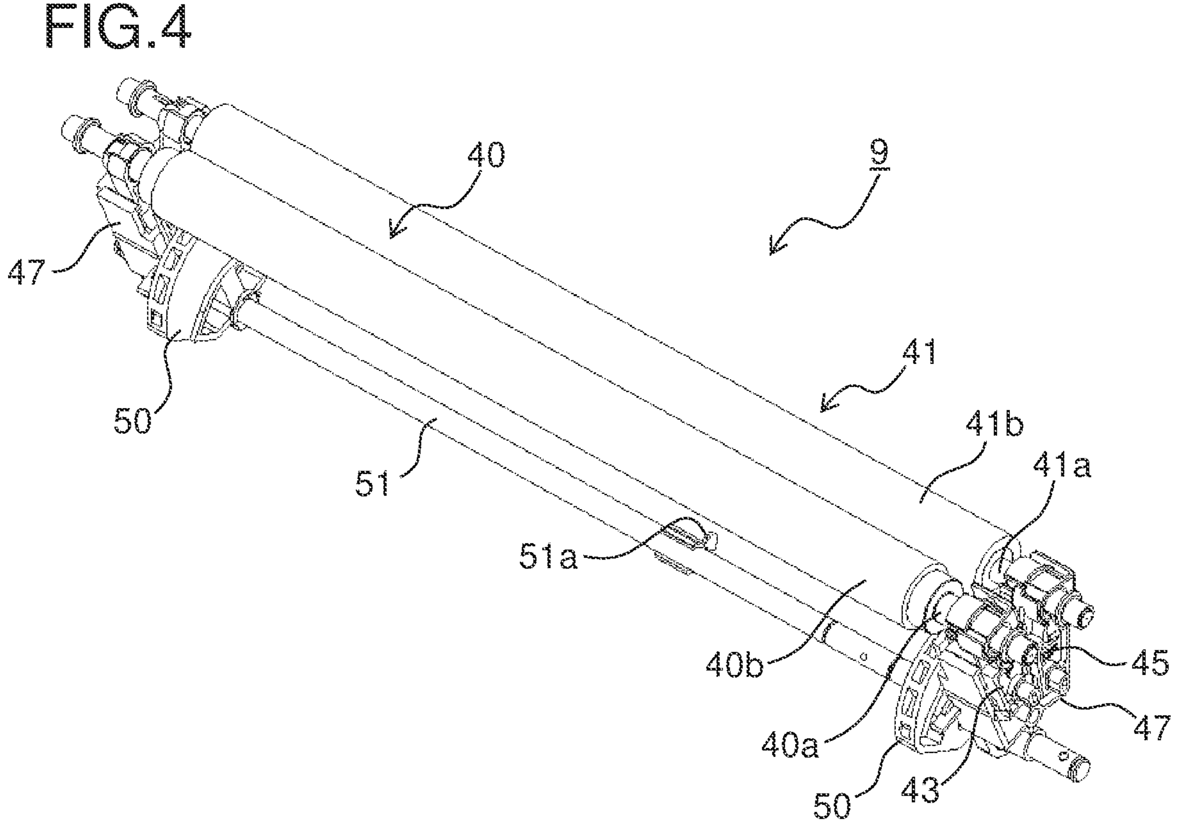
FIG. 4 is a perspective view of a secondary transfer unit according to one embodiment of the present disclosure incorporated in the image forming apparatus.
Figure 5:
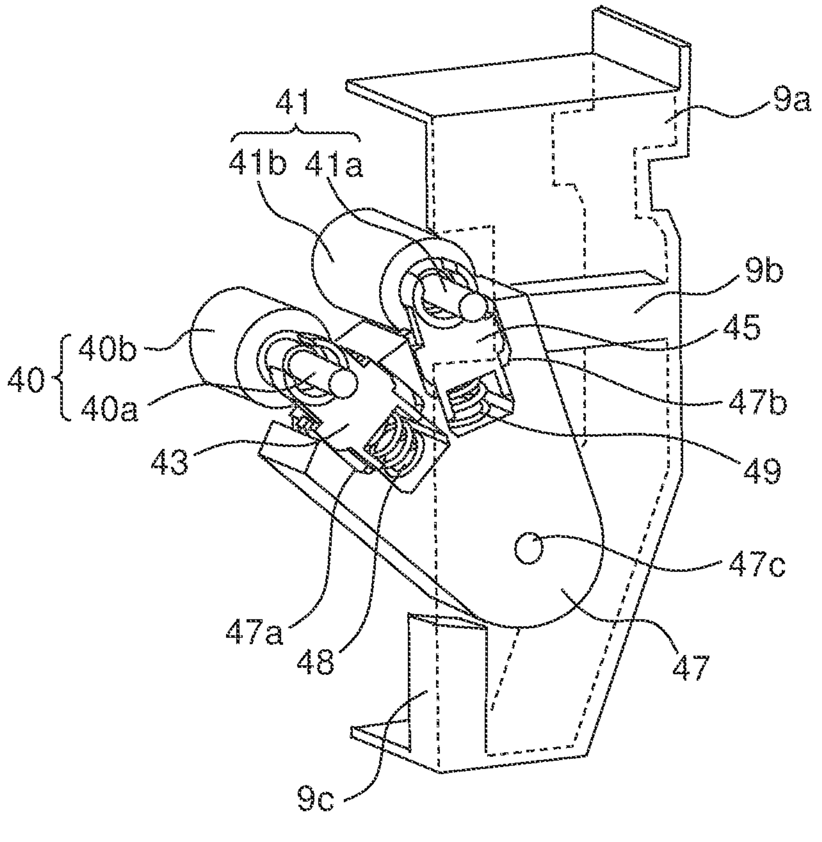
FIG. 5 is an enlarged perspective view illustrating the configuration of the secondary transfer unit according to the embodiment at one end.
Figure 6:
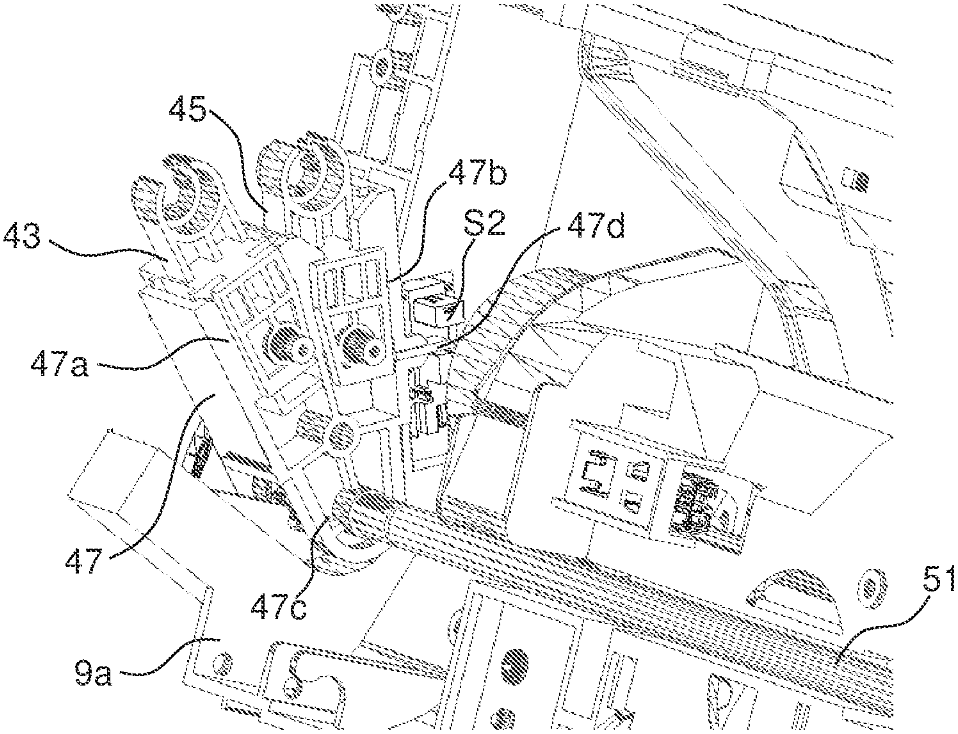
FIG. 6 is a perspective view of and around the roller holder in the secondary transfer unit as seen from inward in the axial direction.
Figure 7:
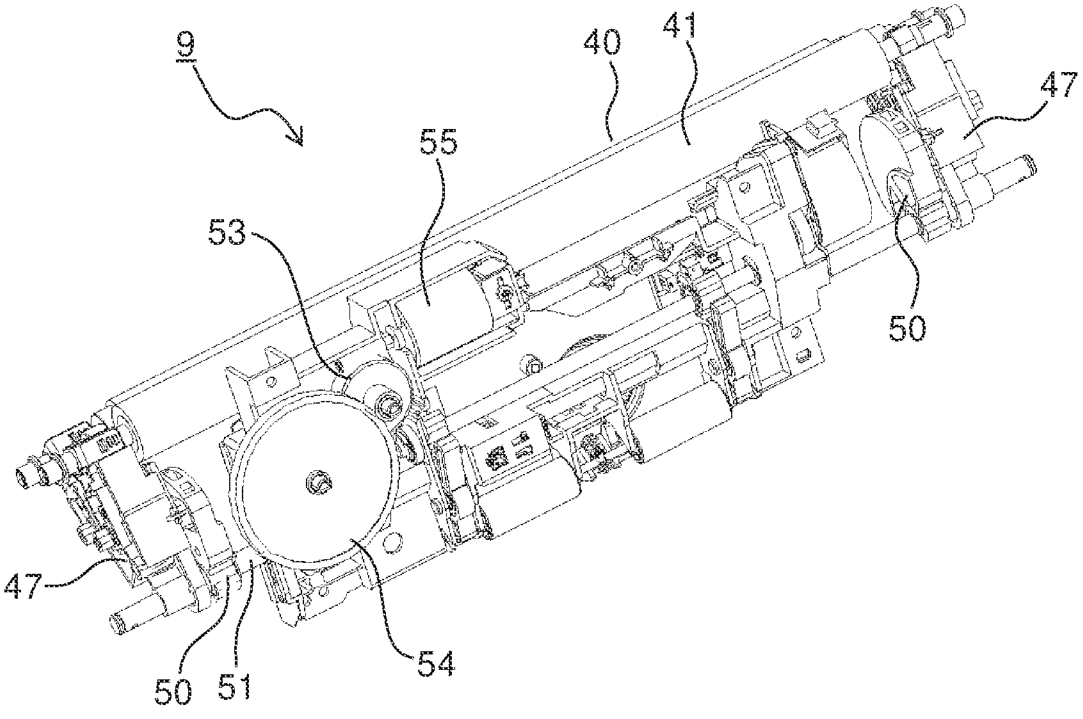
FIG. 7 is a perspective view illustrating a driving mechanism for the secondary transfer unit according to the embodiment.

FIG. 4 is a perspective view, of a secondary transfer unit 9 according to an embodiment of the present disclosure incorporated in the image forming apparatus 100. FIG. 5 is an enlarged perspective view illustrating the configuration of the secondary transfer unit 9 according to the embodiment at one end. FIG. 6 is a perspective view of and around a roller holder 47 in the secondary transfer unit 9 as seen from inward in the axial direction. FIG. 7 is a perspective view illustrating the driving mechanism for the secondary transfer unit 9 according to the embodiment. In FIGS. 4 and 7, a unit frame 9*a* is omitted from illustration, and in FIG. 5, the unit frame 9*a* is illustrated with phantom lines. In FIGS. 5 and 6, a switching cam 50 is omitted from illustration.

As shown in FIGS. 4 to 7, the secondary transfer unit 9 includes a first roller 40 and a second roller 41 as a secondary transfer roller, a first bearing member 43, a second bearing member 45, the roller holder 47, a first coil spring 48, a second coil spring 49, a switching cam 50, and a roller switching motor 55. The first and second bearing members 43 and 45, the roller holder 47, the first and second coil springs 48 and 49, the switching cam 50, and the roller switching motor 55 constitute a roller switching mechanism 57 (see FIG. 8) which switches the arrangement of the first and second rollers 40 and 41.

The first and second rollers 40 and 41 are elastic rollers respectively having electrically conductive elastic layers 40*b* and 41*b* laid around the outer circumferential faces of the metal shafts 40*a* and 41*a* respectively. Used as the material for the elastic layers 40*b* and 41*b* is, for example, ion conductive rubber such as ECO (epichlorohydrin rubber).

The elastic layer 40*b* of the first roller 40 is 311 millimeters long in the axial direction and is compatible with the A3-size sheet. The elastic layer 41*b* of the second roller 41 is longer than the elastic layer 40*b* of the first roller 40 in the axial direction. More specifically, the elastic layer 41*b* is 325 millimeters long in the axial direction and is compatible with the 13 inch-size sheet.

A pair of first bearing members 43 are arranged in opposite end parts of the first roller 40 in the axial direction so as to rotatably support the metal shaft 40*a*. A pair of second bearing members 45 are arranged in opposite end parts of the second roller 41 in the axial direction so as to rotatably support the metal shaft 41*a*.

A pair of roller holders 47 are arranged in opposite end parts of the first and second rollers 40 and 41 in the axial direction. The roller holder 47 is in a V-shape as seen in a side view and has a first bearing holding portion 47*a*, a second bearing holding portion 47*b*, and an insertion hole 47*c*. The first and second bearing holding portions 47*a* and 47*b* slidably support the first and second bearing members 43 and 45 respectively. The insertion hole 47*c* is formed near the vertex of the V-shape, and is rotatably penetrated by a shaft 51. The roller holder 47 is formed of an electrically insulating material such as synthetic resin.

As shown in FIG. 5, between the first bearing holding portion 47*a* and the first bearing member 43, the first coil spring 48 is arranged. Between the second bearing holding portion 47*b* and the second bearing member 45, the second coil spring 49 is arranged. The first and second rollers 40 and 41 are urged by the first and second coil springs 48 and 49 respectively in a direction away from the shaft 51 (a direction for pressed contact with the driving roller 10).

As shown in FIG. 4, the shaft 51 is fitted with a first light-shielding plate 51*a* that, by shielding the sensing portion of a first position sensor S1 (see FIG. 9) from light, makes it possible to sense the rotating angle of the shaft 51.

As shown in FIG. 6, on one side face of the roller holder 47 in the rotation direction, a second light-shielding plate 47*d* is formed. The second light-shielding plate 47*d* is formed at a position where it can shield from light the sensing portion of a second position sensor S2 arranged on the unit frame 9*a*.

The first and second light-shielding plates 51*a* and the 47*d* turn on and off the first and second position sensors S1 and S2 respectively in accordance with the rotating angle of the roller holder 47 (shaft 51), and this makes it possible to sense the position of the first and second rollers 40 and 41 supported on the roller holder 47. The control for sensing the position of the first and second rollers 40 and 41 will be described later.

A pair of switching cans 50 are arranged in opposite end parts of the first and second rollers 40 and 41 in the axial direction, inward of the roller holders 47. The switching cam 50 is in a fan shape as seen in a side view, with the hinge portion of the fan (near the vertex at which two radial lines intersect) fastened to the shaft 51.

As shown in FIG. 7, the shaft 51 is coupled to the roller switching motor 55 via gears 52 and 53. Rotating the switching cam 50 together with the shaft 51 permits the arrangement of the first and second rollers 40 and 41 to be switched. The control for switching between the first and second rollers 40 and 41 will be described later.

Figure 8:
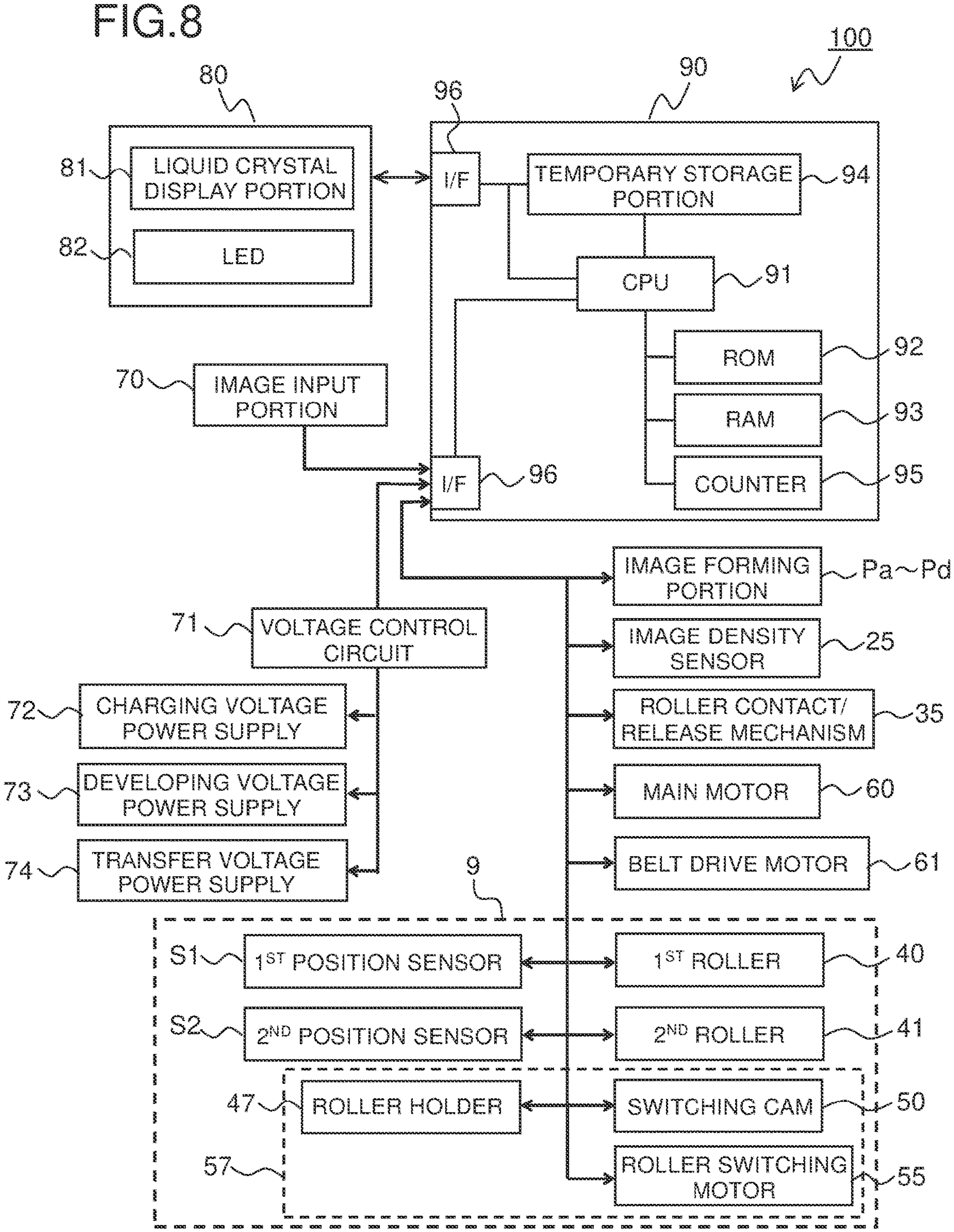
FIG. 8 is a block diagram showing one example of control paths in the image forming apparatus mounted with the secondary transfer unit according to the embodiment.

FIG. 8 is a block diagram showing one example of the control paths in the image forming apparatus 100 mounted with the secondary transfer unit 9 according to the embodiment. In actual use of the image forming apparatus 100, different parts of it are controlled in different ways across complicated control paths all over the image forming apparatus 100. To avoid complexity, the following description focuses on those control paths which are necessary for implementing the present disclosure.

The control portion 90 includes at least a CPU (central processing unit) 91 as a central arithmetic processor, a ROM (read-only memory) 92 as a read-only storage portion, a RAI (random-access memory) 93 as a readable/writable storage portion, a temporary storage portion 94 that temporarily stores image data or the like, a counter 95, and a plurality of (here, two) I/Fs (interfaces) 96 that transmit control signals to different devices in the image forming apparatus 100 and receive input signals from an operation section 80. Furthermore, the control portion 90 can be arranged at any location inside the main body of the image forming apparatus 100.

The ROM 92 stores data and the like that are not changed during use of the image forming apparatus 100, such as control programs for the image forming apparatus 100 and numerical values required for control. The RAM 93 stores necessary data generated in the course of controlling the image forming apparatus 100, data temporarily required for control of the image forming apparatus 100, and the like. Furthermore, the RAM 93 (or the ROM 92) also stores a density correction table used in calibration, as well as the relationship of the on-off states of the first and second position sensors S1 and S2 with the rotating angles of the first and second rollers 40 and 41 and the like for use in the control for switching the rollers which will be described later. The counter 95 counts the number of sheets printed in a cumulative manner.

The control portion 90 transmits control signals to different parts and devices in the image forming apparatus 100 from the CPU 91 through the I/F 96. From the different parts and devices, signals that indicate their statuses and input signals are transmitted through the I/F 96 to the CPU 91. Examples of the various portions and devices controlled by the control portion 90 include the image forming portions Pa to Pd, the exposure device 5, the primary transfer rollers 6*a* to 6*d*, the secondary transfer unit 9, the roller contact/release mechanism 35, the main motor 60, the belt drive motor 61, a voltage control circuit 71, and the operation section 80.

An image input portion 70 is a receiving portion that receives image data transmitted from a host apparatus such as a personal computer to the image forming apparatus 100. An image signal inputted from the image input portion 70 is converted into a digital signal, which then is fed out to the temporary storage portion 94.

The voltage control circuit 71 is connected to a charging voltage power supply 72, a developing voltage power supply 73, and a transfer voltage power supply 74 and operates these power supplies in accordance with output signals from the control portion 90. In response to control signals from the voltage control circuit 71, the charging voltage power supply 72, the developing voltage power supply 73, and the transfer voltage power supply 74 apply predetermined voltages to the charging roller 20 in the charging devices 2*a* to 2*d*, to the developing roller 21 in the developing devices 3*a* to 3*d*, and to the primary transfer rollers 6*a* to 6*d* and the first and second rollers 40 and 41 in the secondary transfer unit 9 respectively.

The operation section 80 includes a liquid crystal display portion 81 and LEDs 82 that indicate various statuses. A user operates a stop/clear button on the operation section 80 to stop image formation and operates a reset button on it to bring various settings for the image forming apparatus 100 to default ones. The liquid crystal display portion 81 indicates the status of the image forming apparatus 100 and displays the progress of image formation and the number of copies printed, Various settings for the image forming apparatus 100 are made via a printer driver on a personal computer.

Figure 9:
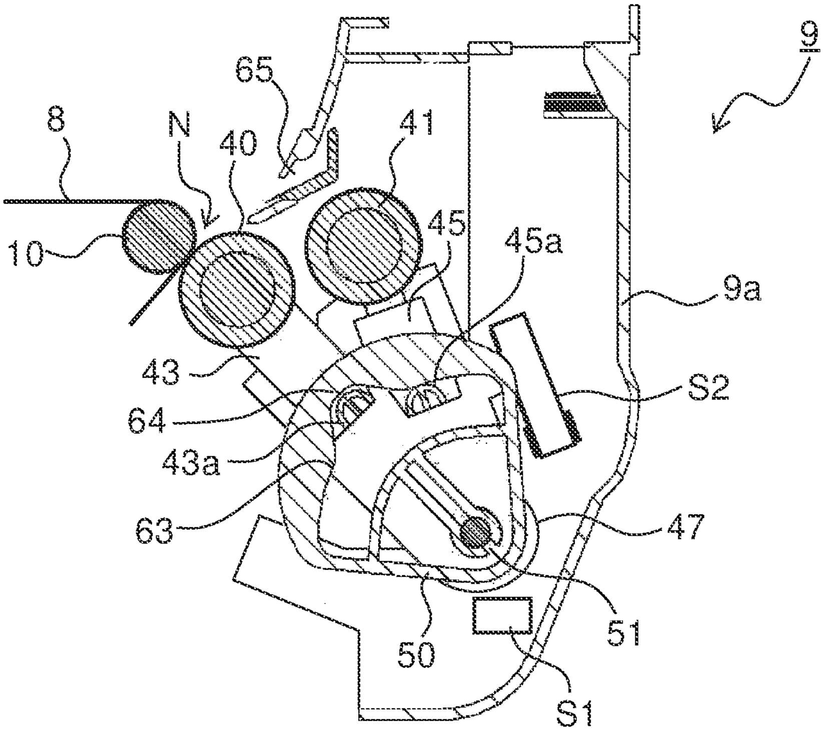
FIG. 9 is a side sectional view of and around a switching cam in the secondary transfer unit according to the embodiment, illustrating a state where a first roller is arranged at a reference position where it forms a secondary transfer nip.

Next, a description will be given of switching control and position sensing control for the first and second rollers 40 and 41 in the secondary transfer unit 9 according to the embodiment. FIG. 9 is a side sectional view of and around the switching cam 50 in the secondary transfer unit 9 according to the embodiment, illustrating a state where the first roller 40 is arranged at a position where it forms the secondary transfer nip N.

As shown in FIG. 9, the switching cam 50 has an arc-shaped guide hole 63 formed in it. A recessed portion 64 is formed in the middle of an outer circumferential part of the guide hole 63 in the radial direction. The first and second bearing members 43 and 45 respectively have a first engaging portion 43*a* and a second engaging portion 45*a* formed on them that engage with the guide hole 63.

In the state in FIG. 9, the first engaging portion 43*a* of the first bearing member 43 engages with the recessed portion 64. Thus, under the urging force of the first coil spring 48 (see FIG. 5), the first roller 40 is kept in pressed contact with the driving roller 10 via the intermediate transfer belt 8 to form the secondary transfer nip N, and the first roller 40 rotates by following the driving roller 10. To the first roller 40, a transfer voltage of the polarity (here, negative) opposite to that of toner is applied by the transfer voltage power supply 74 (see FIG. 8). Specifically, when the first roller 40 is arranged at the position in FIG. 9, the transfer voltage is applied to it via the first bearing member 43 that is electrically connected to the transfer voltage power supply 74.

The first light-shielding plate 51*a* (see FIG. 4) on the shaft 51 shields light from the sensing portion of the first position sensor S1 (on), and the second light-shielding plate 47*d* (see FIG. 6) on the roller holder 47 shields light from the sensing portion of the second position sensor S2 (on). This state (S1/S2 on) is taken as the reference position (home position) of the first roller 40. By restricting the rotating angle of the switching cam 50 based on the rotation time of the switching cam 50 from this reference position, the arrangement and the released state of the first roller 40 are controlled.

Figure 10:
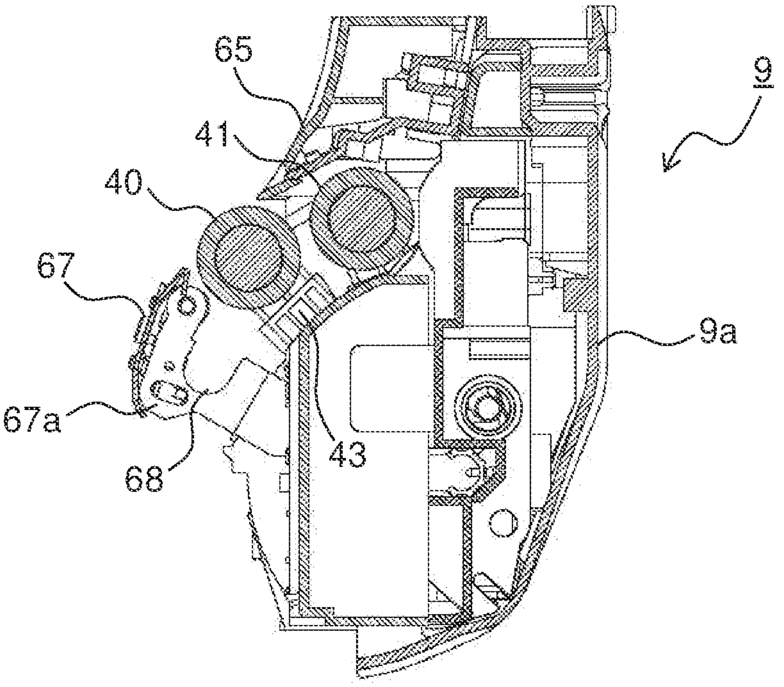
FIG. 10 is a diagram showing the positional relationship of the first and second rollers and downstream-side and upstream-side guides in the state in FIG. 9.
Figure 11:
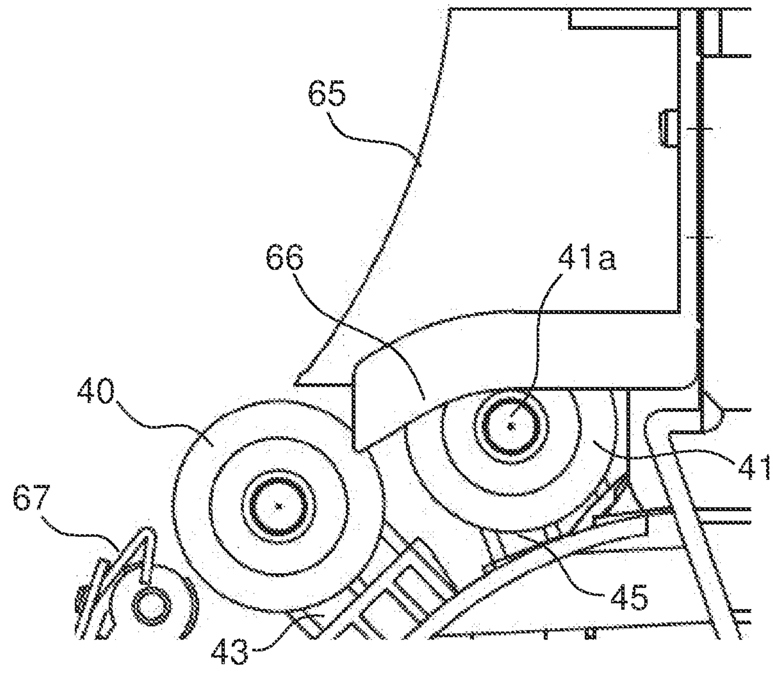
FIG. 11 is an enlarged view around the second roller and the downstream-side guide in FIG. 10.

FIG. 10 is a diagram showing the positional relationship of the first and second rollers 40 and 41 and downstream-side and upstream-side guides 65 and 67 in the state in FIG. 9. FIG. 11 is an enlarged view around the second roller 41 and the downstream-side guide 65 in FIG. 10. The secondary transfer unit 9 includes the downstream-side and upstream-side guides 65 and 67.

The downstream-side guide 65 guides the sheet S that has passed through the secondary transfer nip N to the fixing portion 13 (see FIG. 1). The upstream-side guide 67 guides the sheet S conveyed from the sheet storing cassette 16 via the pair of registration rollers 12*b* (see FIG. 1 for both) to the secondary transfer nip N. The downstream-side and upstream-side guides 65 and 67 constitute part of the conveyance path that extends from the sheet feeding roller 12*a* (sheet feeding portion) to the pair of discharge rollers 15 (sheet discharging portion).

As shown in FIGS. 10 and 11, when the first roller 40 is arranged at the reference position, the second roller 41 is retracted in a space behind the downstream-side guide 65 (first retracted position). A first roller guide portion 66 is formed in opposite end parts of the downstream-side guide 65 in the width direction (direction perpendicular to the plane of FIG. 11). The metal shaft 41*a* of the second roller 41 is pressed against the first roller guide portion 66 by the urging force of the second coil spring 49 (see FIG. 5). When the roller holder 47 rotate clockwise, the metal shaft 41*a* moves along the first roller guide portion 66 and the second roller 41 is guided to the first retracted position.

Figure 12:
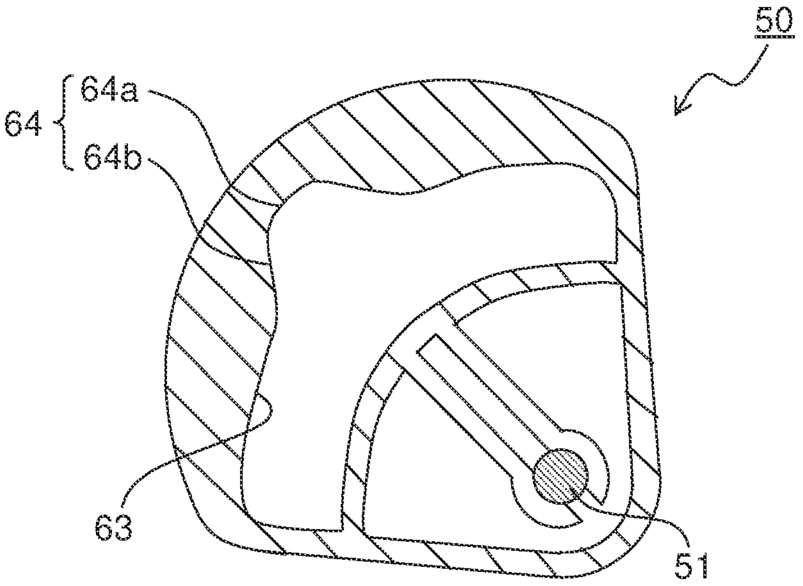
FIG. 12 is a plan view of the switching cam.

FIG. 12 is a plan view of the switching cam 50. The recessed portion 64 of the switching cam 50 is in a substantially trapezoid shape as seen in a plan view and has a bottom portion 64*a* corresponding to the top base of the trapezoid and inclined portions 64*b* corresponding to the legs of the trapezoid. As the switching cam 50 rotates, the first engaging portion 43*a* of the first bearing member 43 and the second engaging portion 45*a* of the second bearing member 45 either engage with the bottom portion 64*a* or the inclined portions 64*b* of the recessed portion 64, or stay away from the recessed portion 64, thereby allowing the state of contact of the first and second rollers 40 and 41 with respect to the intermediate transfer belt 8 to be switched as will be described later.

Figure 13:
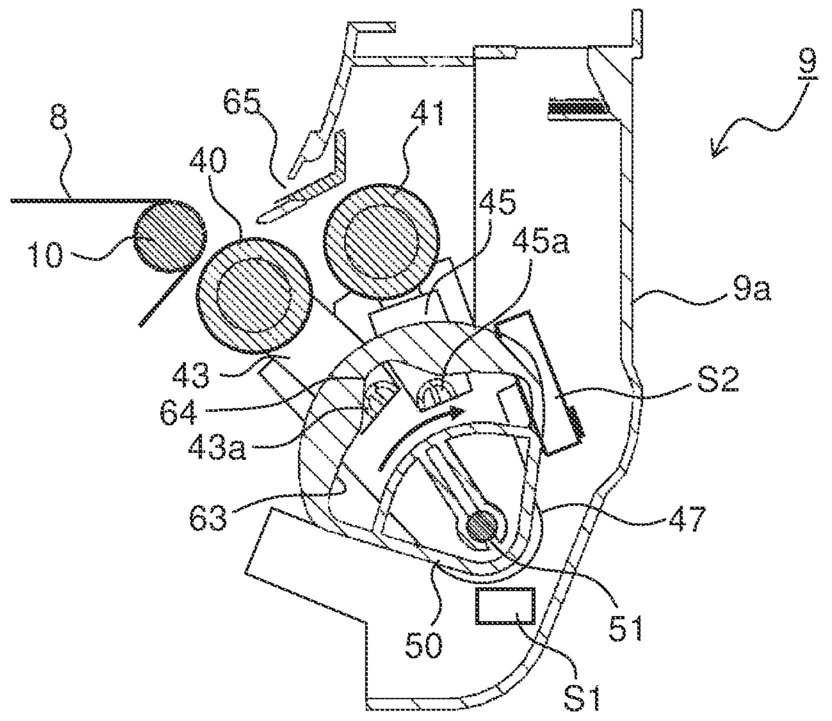
FIG. 13 is a diagram showing a first released state of the first roller where the switching cam has been rotated clockwise from the state in FIG. 9 through a predetermined angle.

FIG. 13 is a diagram showing a state where the switching cam 50 has been rotated clockwise from the state in FIG. 9 through a predetermined angle (here, 10.6° from the reference position in FIG. 9). When the shaft 51 is rotated clockwise, the switching cam 50 rotates along with the shaft 51. On the other hand, the roller holder 47 is restrained from clockwise rotation by the restriction rib 9*b* (see FIG. 5). As a result, the first engaging portion 43*a* of the first bearing member 43 moves from the bottom portion 64*a* to the inclined portion 64*b* of the first recessed portion 64, and the first bearing member 43 moves in the direction toward the shaft 51 against the urging force of the first coil spring 48 (see FIG. 5). Thus, the first roller 40 stays slightly (2 mm) away from the intermediate transfer belt 8 (a first released state).

When the first roller 40 is kept in pressed contact with the driving roller 10 for a long time, the first roller 40 may yield and deform in the axial direction. To avoid that, after a job, the first roller 40 needs to be kept away from the intermediate transfer belt S (driving roller 10). This is achieved in the first released state shown in FIG. 13.

The first light-shielding plate 51*a* on the shaft 51 is retracted from the sensing portion of the first position sensor S1 (off), and the second light-shielding plate 47*d* on the roller holder 47 keeps shielding light from the sensing portion of the second position sensor S2 (on). That is, when the sensing state changes from the one in FIG. 9 (S1/S2 on) to the one in FIG. 13 (S1 off/S2 on), the first roller 40 can be sensed to have moved from the reference position to the first released state.

Figure 14:
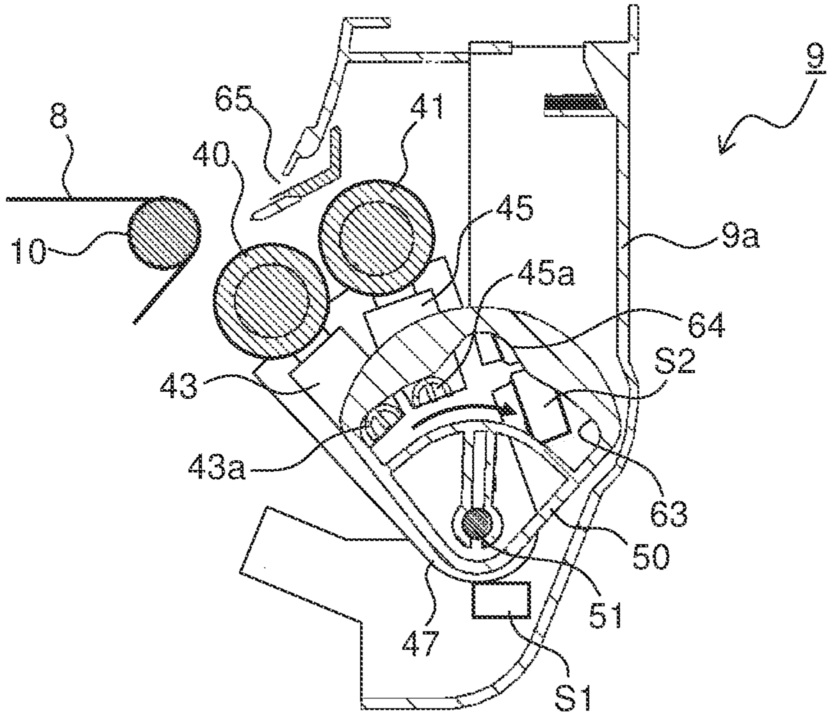
FIG. 14 is a diagram showing a second released state of the first roller where the switching cam has been rotated further clockwise from the state in FIG. 13 through a predetermined angle.

FIG. 14 is a diagram showing a state where the switching can 50 has been rotated further clockwise from the state in FIG. 13 through a predetermined angle (here, 46.4° from the reference position in FIG. 9). When the shaft 51 is rotated further clockwise, the switching cam 50 rotates further clockwise along with the shaft 51. On the other hand, the roller holder 47 is restrained from clockwise rotation by the restriction rib 9*b* (see FIG. 5). As a result, the first engaging portion 43*a* of the first bearing member 43 moves away from the recessed portion 64, and the first bearing member 43 moves further in the direction toward the shaft 51 against the urging force of the first coil spring 48 (see FIG. 5). Thus, the first roller 40 stays completely (6.5 mm) away from the intermediate transfer belt s (the second released state). The second released state is used only for switching from the first roller 40 to the second roller 41.

The sensing state of the first and the second position sensors S1 and S2 in FIG. 14 is similar to that in the first released state (S1 off/S2 on) shown in FIG. 13. Thus, when the S1 off/S2 on state is sensed as the image forming apparatus 100 starts up, the roller holder 47 is rotated for a given period toward the main body of the image forming apparatus 100 (counter-clockwise) to distinguish between the first and second released states. Then, if the S1/S2 on state occurs, the first released state is recognized and, if the S1/S2 on state does not occur, the second released state is recognized.

To shift the first roller 40 in the second released state back to the reference position, it is necessary to rotate the roller holder 47 and the switching cam 50 counter-clockwise first to switch to the reference position of the second roller 41 (see FIG. 16) and then to switch back to the reference position of the first roller 40 (see FIG. 9).

Next, a description will be given of a procedure for switching the roller that forms the secondary transfer nip N from the first roller 40 to the second roller 41. When the shaft 51 is rotated counter-clockwise from the second released state shown in FIG. 14, the switching cam 50 rotates counter-clockwise along with the shaft 51. Also, the first and second bearing members 43 and 45 are urged in a direction away from the shaft 51 under the urging force of the first and second coil springs 48 and 49 (see FIG. 5 for both) respectively, Thus, the first and second engaging portions 43*a* and 45*a* are pressed against a circumferential part, outward in the radial direction, of the guide hole 63 in the switching cam 50. Thus, the roller holder 47 rotates counter-clockwise along with the switching cam 50.

Figure 15:
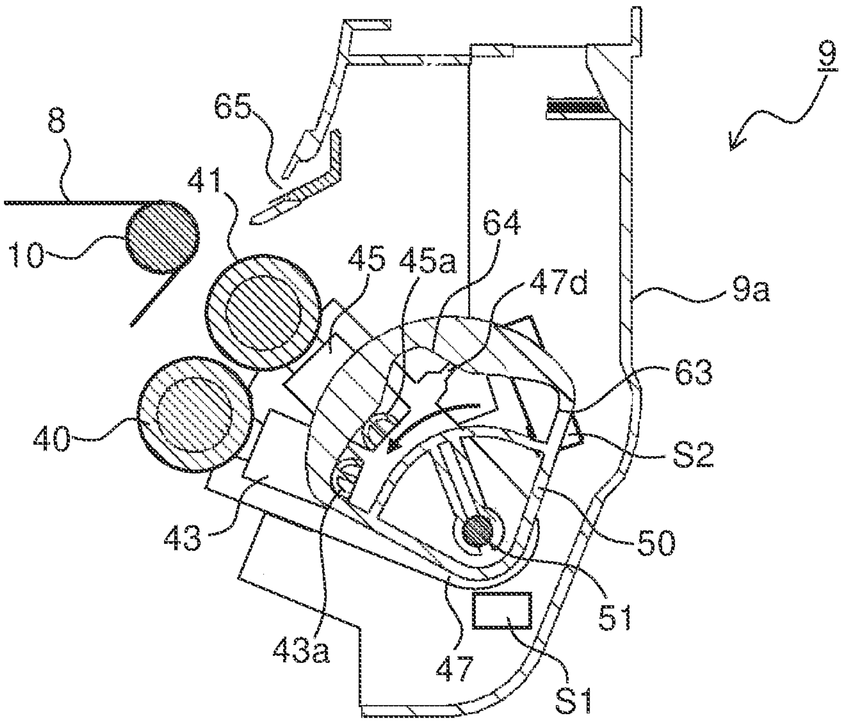
FIG. 15 is a diagram showing the state when the shaft has been rotated counter-clockwise from the state in FIG. 14 and the second roller is arranged at a position opposite the driving roller.

When the roller holder 47 rotates until it makes contact with the restriction rib 9*c* (see FIG. 5), the second roller 41 is arranged at a position opposite the driving roller 10 as shown in FIG. 15. In the state in FIG. 15, the first light-shielding plate 51*a* on the shaft 51 is retracted from the sensing portion of the first position sensor S1 (off), and the second light-shielding plate 47*d* on the roller holder 47 is retracted from the sensing portion of the second position sensor S2 (off). That is, a transition from the sensing state in FIG. 14 (S1 off/S2 on) to the sensing state in FIG. 15 (S1/S2 off) permits the second roller 41 to be sensed to have moved to the position opposite the driving roller 10.

Figure 16:
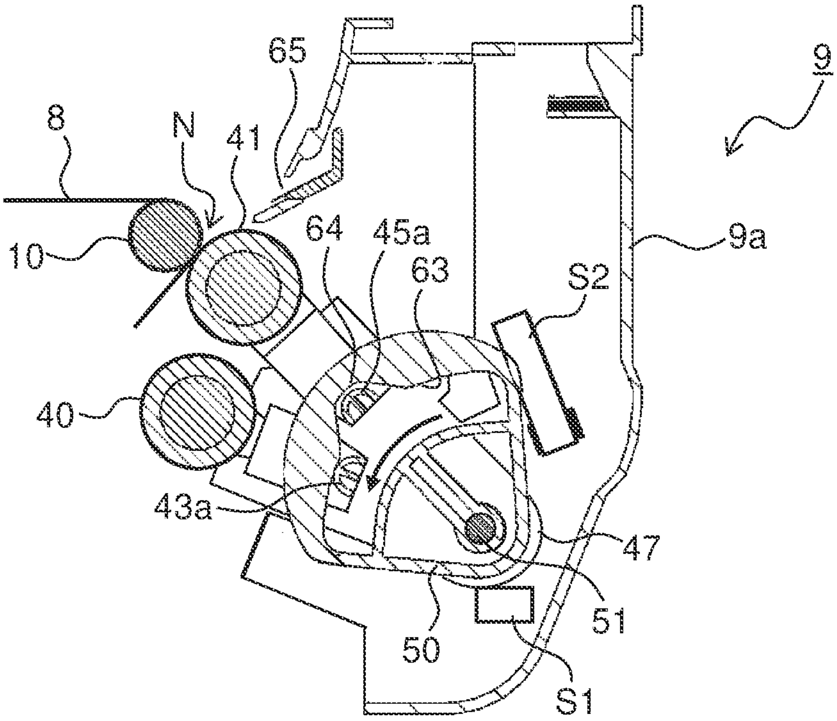
FIG. 16 is a diagram showing a state where the switching cam has been rotated counter-clockwise from the state in FIG. 14 through a predetermined angle and the second roller is arranged at the reference position to form the secondary transfer nip.

FIG. 16 is a diagram showing a state where the switching cam 50 has been rotated counter-clockwise from the state in FIG. 15 through a predetermined angle. When the shaft 51 is rotated counter-clockwise, the switching cam 50 rotates along with the shaft 51. On the other hand, the roller holder 47 is restrained from counter-clockwise rotation by the restriction rib 9*c* (see FIG. 5). As a result, the second engaging portion 45*a* of the second bearing member 45 moves to the bottom portion 64*a* of the recessed portion 64, and the second bearing member 45 moves in the direction away from the shaft 51 against the urging force of the second coil spring 49 (see FIG. 5).

As a result, the second roller 41 is kept in pressed contact with the driving roller 10 via the intermediate transfer belt 8 to form the secondary transfer nip N and rotates by following the driving roller 10. To the second roller 41, a transfer voltage of the polarity (here, negative) opposite to that of toner is applied by the transfer voltage power supply 74 (see FIG. 8). Specifically, when the second roller 41 is arranged at the position in FIG. 16, the transfer voltage is applied to it via the second bearing member 45 that is electrically connected to the transfer voltage power supply 74.

The first light-shielding plate 51*a* on the shaft 51 shields light from the sensing portion of the first position sensor S1 (on), and the second light-shielding plate 47*d* on the roller holder 47 is retracted from the sensing portion of the second position sensor S2 (off). This state (S1 on/S2 off) is taken as the reference position (home position) of the second roller 41. That is, when the sensed state changes from the one in FIG. 15 (S1/S2 off) to the one in FIG. 16 (St on/S2 off), the second roller 41 can be sensed to have moved to the reference position. By restricting the rotating angle of the switching cam 50 based on the rotation time of the switching cam 50 from this reference position, the arrangement and the released state of the second roller 41 are controlled.

Figure 17:
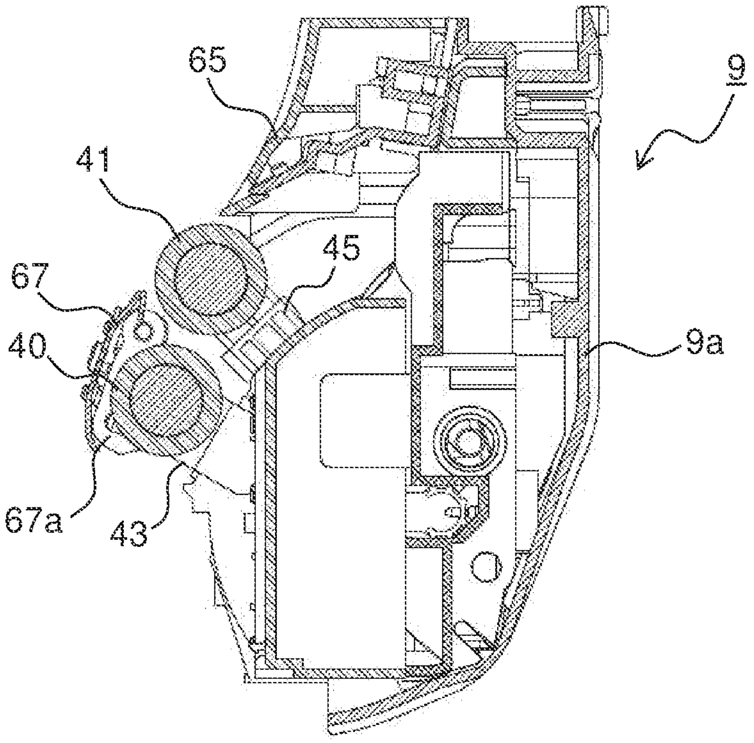
FIG. 17 is a diagram showing the positional relationship of the first and second rollers and downstream-side and upstream-side guides in the state in FIG. 16.
Figure 18:
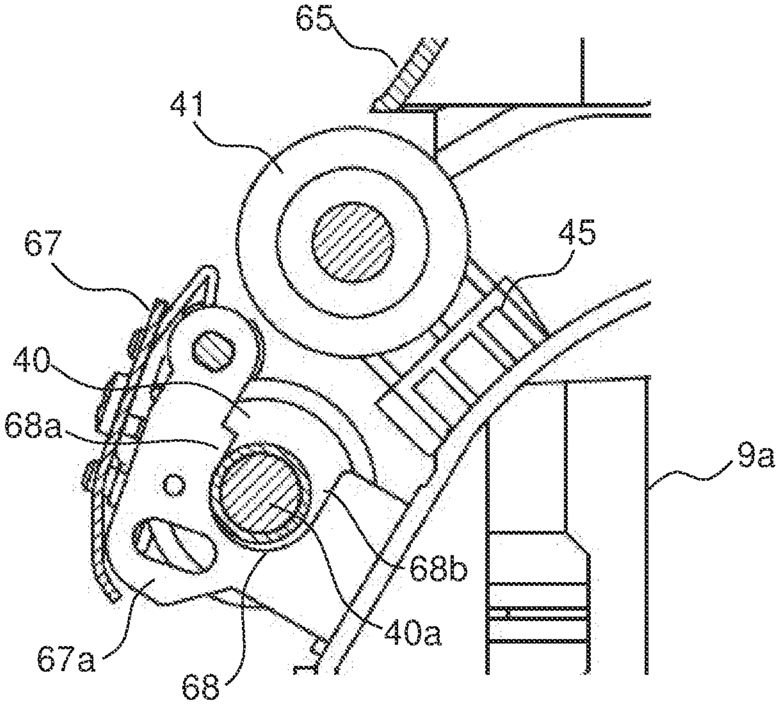
FIG. 18 is an enlarged view around the first roller and the upstream-side guide in FIG. 17.

FIG. 17 is a diagram showing the positional relationship of the first and second rollers 40 and 41 and the downstream-side and upstream-side guides 65 and 67 in the state in FIG. 16. FIG. 18 is an enlarged view around the first roller 40 and the upstream-side guide 67 in FIG. 17.

As shown in FIGS. 17 and 18, when the second roller 41 is arranged at the reference position, the first roller 40 is retracted in a space behind the upstream-side guide 67 (second retracted position). A support frame 67*a* which couples the upstream-side guide 67 to the unit frame 9*a* is provided in opposite end parts of the upstream-side guide 67 in the width direction (direction perpendicular to the plane of FIG. 18). A second roller guide portion 68 is formed in the support frame 67*a*.

The second roller guide portion 68 is in a U-shape as seen in a side view and the distance between its outer and inner surfaces 68*a* and 68*b*, which face away from each other, is slightly larger than the outer diameter of the metal shaft 40*a*. The metal shaft 40*a* of the first roller 40 is pressed against the outer surface 68*a* of the second roller guide portion 68 by the urging force of the first coil spring 48 (see FIG. 5). As the roller holder 47 rotates counter-clockwise, the metal shaft 40*a* moves along the second roller guide portion 68 and the first roller 40 is guided to the second retracted position.

Figure 19:
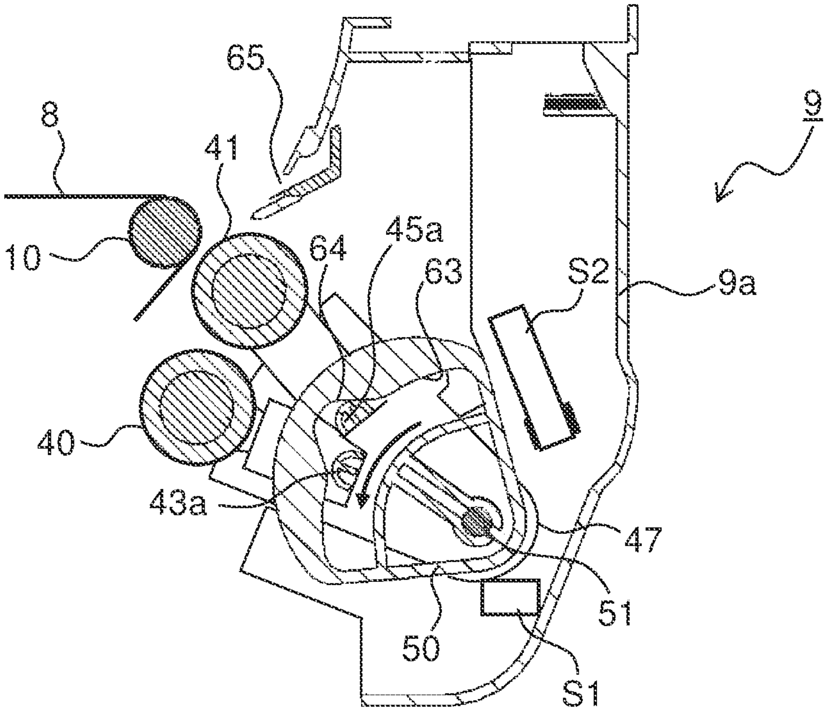
FIG. 19 is a diagram showing the first released state of the second roller where the switching cam has been rotated further counter-clockwise from the state in FIG. 16 through a predetermined angle.

FIG. 19 is a diagram showing a state where the switching cam 50 has been rotated further counter-clockwise from the state in FIG. 16 through a predetermined angle (here, 10.6° from the reference position in FIG. 16). When the shaft 51 is rotated further counter-clockwise, the switching cam 50 rotates further counter-clockwise along with the shaft 51. On the other hand, the roller holder 47 is restrained from counter-clockwise rotation by the restriction rib 9*c* (see FIG. 5). As a result, the second engaging portion 45*a* of the second bearing member 45 moves from the bottom portion 64*a* of the recessed portion 64 to the inclined portion 64*b* and the second bearing member 45 moves in the direction toward the shaft 51 against the urging force of the second coil spring 49 (see FIG. 5). Thus, the second roller 41 stays slightly (2 mm) away from the intermediate transfer belt 8 (the first released state).

When the second roller 41 is kept in pressed contact with the driving roller 10 for a long time, the second roller 41 may yield and deform in the axial direction. To avoid that, after a job, the second roller 41 needs to be kept away from the intermediate transfer belt 8 (driving roller 10). This is achieved in the first released state shown in FIG. 19. When calibration is executed during use of the second roller 41, the second roller 41 is brought into the first released state so that the reference image formed on the intermediate transfer belt 8 does not adhere to the second roller 41. When calibration is executed while the second roller 41 is in the first released state, it is possible to form a reference image in a middle part of the intermediate transfer belt 8 in the width direction.

The first light-shielding plate 51*a* on the shaft 51 is retracted from the sensing portion of the first position sensor S1 (off), and the second light-shielding plate 47*d* on the roller holder 47 is kept retracted from the sensing portion of the second position sensor S2 (off). That is, when the sensing state changes from the one in FIG. 16 (S1 on/S2 off) to the one in FIG. 19 (S1/S2 off), the second roller 41 can be sensed to have moved from the reference position to the first released state.

Figure 20:
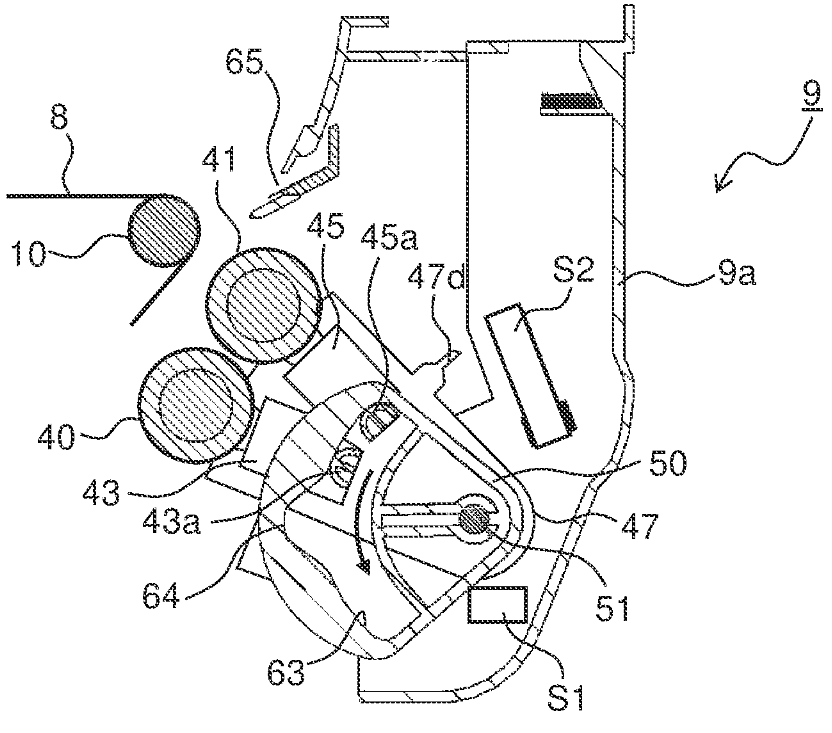
FIG. 20 is a diagram showing the second released state of the second roller where the switching cam has been rotated further counter-clockwise from the state in FIG. 19 through a predetermined angle.

FIG. 20 is a diagram showing a state where the switching cam 50 has been rotated further counter-clockwise from the state in FIG. 19 through a predetermined angle (here, 46.4° from the reference position in FIG. 16). When the shaft 51 is rotated further counter-clockwise, the switching cam 50 rotates further counter-clockwise along with the shaft 51. On the other hand, the roller holder 47 is restrained from counter-clockwise rotation by the restriction rib 9*c* (see FIG. 5). As a result, the second engaging portion 45*a* of the second bearing member 45 moves away from the recessed portion 64, and the second bearing member 45 moves further in the direction toward the shaft 51 against the urging force of the second coil spring 49 (see FIG. 5). Thus, the second roller 41 stays completely (6.5 mm) away from the intermediate transfer belt 8 (the second released state). The second released state is used only for switching from the second roller 41 to the first roller 40.

The sensing state of the first and the second position sensors S1 and S2 in FIG. 20 is similar to that in the first released state (S1/S2 off) shown in FIG. 19. Thus, when the S1/S2 off state is sensed as the image forming apparatus 100 starts up, the roller holder 47 is rotated for a given period in the direction toward the double-sided conveyance path 18 (clockwise) to distinguish between the first and second released states. Then, if the S1 on/S2 off state occurs, the first released state is recognized and, if the S1 on/S2 off state does not occur, the second released state is recognized.

To shift the second roller 41 in the second released state back to the reference position, it is necessary to rotate the roller holder 47 and the switching cam 50 clockwise first to switch to the reference position of the first roller 40 (see FIG. 9) and then to switch back to the reference position of the second roller 41 (see FIG. 16).

Figure 21:
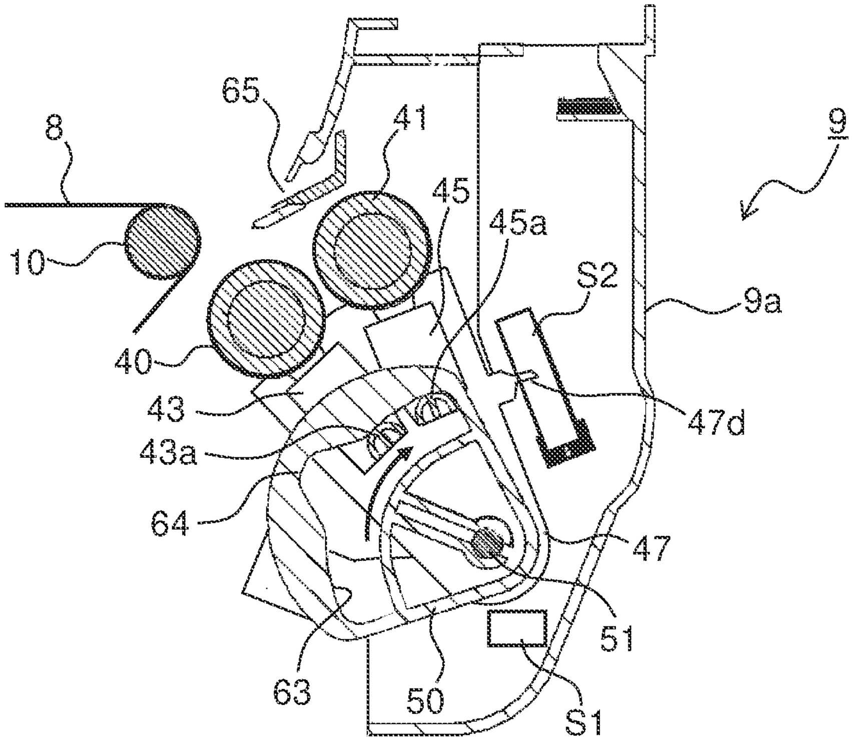
FIG. 21 is a diagram showing the state when the switching cam has been rotated clockwise from the state in FIG. 20 and the first roller is arranged at a position opposite the driving roller.

When the roller that forms the secondary transfer nip N is switched from the second roller 41 to the first roller 40, the switching cam 50 is rotated from the second released state shown in FIG. 20 clockwise through a predetermined angle. As a result, the switching cam 50 and the roller holder 47 rotate clockwise along with the switching cam 50 through the predetermined angle, and when the roller holder 47 rotates until it makes contact with the restriction rib 9*b*, the first roller 40 goes into the state shown in FIG. 21 where the first roller 40 faces the driving roller 10. When the switching cam 50 is rotated further clockwise through a predetermined angle from the state in FIG. 21, the first roller 40 goes into the state shown in FIG. 9 where the first roller 40 is arranged at the reference position. Through repetition of the procedure described above, switching between the first and second rollers 40 and 41 is achieved.

With the configuration according to the embodiment, despite a simple configuration using the roller holder 47 and the switching cam 50, it is possible to arrange either the first or second roller 40 or 41 opposite the driving roller 10, and to arrange the first or second roller 40 or 41 selectively either at the reference position, where it forms the secondary transfer nip N, or a released position, where it stays away from the intermediate transfer belt 8.

For example, if the sheet S is equal to or smaller than a predetermined size (here, A3 size), the first roller 40 with the smaller elastic layer 40*b* in the axial direction is arranged at the reference position. Then, when calibration is performed during image formation in which the reference image is formed on the intermediate transfer belt 8 outside the image area in the width direction (outside the first roller 40 in the axial direction), the reference image formed on the intermediate transfer belt 8 does not make contact with the first roller 40. Thus, calibration can be performed during image formation, and this helps improve image quality without a drop in image processing efficiency (productivity).

It is also possible to effectively suppress staining on the rear surface of the sheet S due to toner adhering to the first roller 40. Furthermore, it is not necessary to perform cleaning operation to move the toner deposited on the first roller 40 back to the intermediate transfer belt 8, and this helps reduce printing wait time.

By contrast, if the sheet S is larger than the predetermined size (here, 13 inch size), the second roller 41 with the elastic layer 41*b* larger in the axial direction is arranged at the reference position. Then, it is possible to ensure that the toner image is secondarily transferred to the opposite edge parts of the large-size sheet S in the width direction.

When the first roller 40 is arranged at the reference position, the second roller 41 is arranged at the first retracted position behind the downstream-side guide 65 and when the second roller 41 is arranged at the reference position, the first roller 40 is arranged at the first retracted position behind the upstream-side guide 67; thus the unused transfer roller is not exposed to the conveyance path of the sheet S. As a result, it is possible to suppress jamming of the sheet S. Furthermore, it is not necessary to additionally provide a cover member to cover the first and second rollers 40 and 41, or a retracted space for the first and second rollers 40 and 41 when these are unused, and this contributes to reducing the number of components, and to saving the space for the secondary transfer unit 9 and the image forming apparatus 100.

In this embodiment, it is possible to switch the released position of the first and second rollers 40 and 41 between the first released state with a smaller distance from the intermediate transfer belt 8 and the second released state with a larger distance from it. Thus, when, after a job, the first and second rollers 40 and 41 are laid away from the driving roller 10 to prevent their deformation, if calibration is executed during use of the second roller 41, laying the first and second rollers 40 and 41 in the first released state helps reduce the time until they are arranged at the reference position at which they form the secondary transfer nip N. Thus, it is possible to minimize a drop in image processing efficiency (productivity) due to the movement of the first and second rollers 40 and 41.

Furthermore, in this embodiment, it is possible to drive the roller holder 47 and the switching cam 50 with the single roller switching motor 55. Thus, compared to a configuration where the roller holder 47 and the switching cam 50 are driven with separate motors, the driving mechanism and the driving control can be simplified, and this helps reduce the cost and the size of the image forming apparatus 100.

The embodiment described above is in no way meant to limit the present disclosure, which thus allows for many modifications and variations within the spirit of the present disclosure. For example, while, in the embodiment described above, the elastic layer 41*b* of the second roller 41 is longer than the elastic layer 40*b* of the first roller 40 in the axial direction, the elastic layer 41*b* of the second roller 41 may be shorter than the elastic layer 40*b* of the first roller 40 in the axial direction. The shapes and dimensions specifically mentioned above of the roller holder 47, the switching cam 50, the upstream-side and downstream-side guides 65 and 67 that constitute the secondary transfer unit 9 are merely examples and can be freely modified without spoiling the effect of the present disclosure.

In the embodiment described above, the roller switching mechanism including the first and second bearing members 43 and 45, the roller holder 47, the first and second coil springs 48 and 49, the switching cam 50, and the roller switching motor 55 switches the arrangement of the first and second rollers 40 and 41; instead it is also possible to switch the arrangement of the first and second rollers 40 and 41 with another switching mechanism.

While the above embodiment deals with, as an example, an intermediate transfer-type image forming apparatus 100 provided with the secondary transfer unit 9 by which the toner image that has been primarily transferred to the intermediate transfer belt 8 is secondarily transferred to the sheet S, what is disclosed herein is applicable similarly to transfer units mounted on a direct transfer-type image forming apparatus in which a toner image formed on the photosensitive drum is directly transferred to the sheet.

The present disclosure is applicable to an image forming apparatus provided with a transfer unit for transferring a toner image formed on an image carrying member to a recording medium. Based on the present disclosure, it is possible to provide a transfer unit that can, with a simple configuration, switch two transfer rollers with different lengths in the axial direction and that can suppress a drop in image forming efficiency due to the switching of transfer rollers, as well as to provide an image forming apparatus incorporating such a transfer unit.

What is claimed is:

1. A transfer unit that transfers a toner image formed on an image carrying member, to a recording medium as the recording medium passes through a transfer nip, the transfer unit comprising:

a transfer roller including a metal shaft and an elastic layer laid around an outer circumferential face of the metal shaft, the transfer roller forming the transfer nip by keeping the elastic layer in pressed contact with the image carrying member, the transfer roller including a first roller and a second roller, the second roller being arranged downstream of the first roller in a conveyance direction of the recording medium and being different from the first roller in a length of the elastic layer in an axial direction;

a roller switching mechanism that arranges the first or second roller selectively at a reference position where the first or second roller forms the transfer nip by being kept in pressed contact with the image carrying member;

an upstream-side guide arranged upstream of the transfer nip in the conveyance direction of the recording member; and a downstream-side guide arranged downstream of the transfer nip in the conveyance direction of the recording member, wherein when the first roller moves to the reference position by the roller switching mechanism, the second roller moves to a first retracted position behind the downstream-side guide, and when the second roller moves to the reference position by the roller switching mechanism the first roller moves to a second retracted position behind the upstream-side guide and opposite the image carrying member across the upstream-guide, wherein the downstream-side guide has a first roller guide portion that makes contact with the metal shaft of the second roller, the upstream-side guide has a second roller guide portion that makes contact with the metal shaft of the first roller, when the first roller moves to the reference position, the metal shaft of the second roller moves along the first roller guide portion and the second roller is guided to the first retracted position, and when the second roller moves to the reference position, the metal shaft of the first roller moves along the second roller guide portion and the first roller is guided to the second retracted position.

2. A transfer unit that transfers a toner image formed on an image carrying member, to a recording medium as the recording medium passes through a transfer nip, the transfer unit comprising:

a transfer roller including a metal shaft and an elastic layer laid around an outer circumferential face of the metal shaft the transfer roller forming the transfer nip by keeping the elastic layer in pressed contact with the image carrying member, the transfer roller including a first roller and a second roller, the second roller being arranged downstream of the first roller in a conveyance direction of the recording medium and being different from the first roller in a length of the elastic layer in an axial direction;

a roller switching mechanism that arranges the first or second roller selectively at a reference position where the first or second roller forms the transfer nip by being kept in pressed contact with the image carrying member;

an upstream-side guide arranged upstream of the transfer nip in the conveyance direction of the recording member; and a downstream-side guide arranged downstream of the transfer nip in the conveyance direction of the recording member, wherein when the first roller moves to the reference position by the roller switching mechanism, the second roller moves to a first retracted position behind the downstream-side guide, and when the second roller moves to the reference position b the roller switching mechanism, the first roller moves to a second retracted position behind the upstream-side guide and opposite the image carrying member across the upstream-guide, wherein the roller switching mechanism comprises:

a first bearing member that rotatably supports the first roller;

a second bearing member that rotatably supports the second roller;

a roller holder that has a first bearing holding portion and a second bearing holding portion that respectively hold the first and second bearing members slidably in directions toward and away from the image carrying member;

a first urging member arranged between the first bearing holding portion and the first bearing member, the first urging member urging the first bearing member in the direction toward the image carrying member;

a second urging member arranged between the second bearing holding portion and the second bearing member, the second urging member urging the second bearing member in the direction toward the image carrying member;

a switching cam that has a guide hole that engages with a first engaging portion formed on the first bearing member and a second engaging portion formed on the second bearing member; and a driving mechanism that drives the roller holder and the switching cam to rotate, wherein by rotating the roller holder, one of the first and second rollers is arranged opposite the image carrying member, and by rotating the switching cam to change positions at which the first and second engaging portions engage with the guide hole, the first or second roller that is arranged opposite the image carrying member is arranged selectively either at the reference position at which the first or second roller is kept in pressed contact with the image carrying member to form the transfer nip or at a released position at which the first or second roller stays away from the image carrying member.

3. The transfer unit according to claim 2, wherein the switching cam has a recessed portion formed in a circumferential part of the guide hole outward in a radial direction, and by engaging the first or second engaging portions with the recessed portion, the first or second rollers arranged opposite the image carrying member is arranged at the reference position.

4. The transfer unit according to claim 3, wherein the recessed portion is in a trapezoid shape as seen in a plan view, by engaging the first or second engaging portion with an inclined portion of the recessed portion, the first or second roller is brought into a first released state where the first or second roller stays away from the image carrying member across a predetermined distance, and by moving the first or second engaging portion away from the recessed portion, the first or second roller is brought into a second released state where the first or second roller stays away from the image carrying member across a distance larger than in the first released state.

5. The transfer unit according to claim 4, when the toner image is not transferred to the image carrying member, the first or second roller arranged at the reference position is brought into the first released state.

6. The transfer unit according to claim 4, when the first roller arranged opposite the image carrying member is switched to the second roller, the first roller is brought into a second released state, when the second roller arranged opposite the image carrying member is switched to the first roller, the second roller is brought into a second released state.

7. An image forming apparatus comprising:

a plurality of the image forming portions that form toner images of different colors;

an endless intermediate transfer belt as an image carrying member, the intermediate transfer belt moving along the image forming portions;

a plurality of primary transfer members that are arranged, across the intermediate transfer belt, opposite photosensitive drums arranged respectively in the image forming portions, the primary transfer members primarily transferring the toner images formed on the photosensitive drums to the intermediate transfer belt; and a secondary transfer unit as the transfer unit according to claim 1, the secondary transfer unit secondarily transferring the toner images primarily transferred to the intermediate transfer belt to a recording medium.

8. An image forming apparatus comprising:

a plurality of the image forming portions that form toner images of different colors;

an endless intermediate transfer belt as an image carrying member, the intermediate transfer belt moving along the image forming portions;

a plurality of primary transfer members that are arranged, across the intermediate transfer belt, opposite photosensitive drums arranged respectively in the image forming portions, the primary transfer members primarily transferring the toner images formed on the photosensitive drums to the intermediate transfer belt; and a secondary transfer unit as the transfer unit according to claim 2, the secondary transfer unit secondarily transferring the toner images primarily transferred to the intermediate transfer belt to a recording medium.

* * * * *